United States Patent [19]
Astengo

[11] 3,744,309
[45] July 10, 1973

[54] PITCH SIGNAL CALCULATOR FOR AIRCRAFT

[75] Inventor: Ralph A. Astengo, Bellevue, Wash.

[73] Assignee: Sundstrand Data Control, Inc., Redmond, Wash.

[22] Filed: July 20, 1970

[21] Appl. No.: 56,613

[52] U.S. Cl. ............................................73/178 R
[51] Int. Cl. ............................................G01c 23/00
[58] Field of Search .....73/178 R, 178 T, 178 H, 1 E; 33/204.2

[56] References Cited
UNITED STATES PATENTS
3,371,528  3/1968  Sullivan....................73/178 T Primary Examiner—Donald O. Woodiel
Attorney—Hofgren, Wegner, Allen, Stellman & McCord

[57] ABSTRACT

An instrument for calculating the pitch angle of an aircraft from two pitch signals, one having long term and the other short term pitch accuracy. The long term pitch signal is derived from a longitudinal accelerometer. A measured pitch signal having short term accuracy is provided by a vertical gyroscope. An airspeed acceleration signal is provided by a vertical gyroscope. An airspeed acceleration signal is subtracted from the accelerometer output to eliminate the acceleration component of the signal.

The calculated and measured pitch signals are combined or blended in selected inverse proportions.

6 Claims, 5 Drawing Figures

INVENTOR
Ralph A. Astengo

BY Hofgren, Wegner, Allen, Stellman & McCord
ATTORNEYS

PITCH SIGNAL CALCULATOR FOR AIRCRAFT

BACKGROUND OF THE INVENTION

This invention relates to an instrument for computing or calculating the pitch angle of an aircraft.

Vertical gyroscopes have commonly been used to derive the pitch angle of an aircraft for use in various instrumentation. However, the output of a gyroscope, when uncorrected, has not always proven adequate, particularly when long term pitch information is needed. Ideally, a gyroscope remains fixed in inertial space, but in practical usage it is subject to numerous types of errors. Initially, there is a likelihood that the gyroscope will be mounted with some misalignment from the desired position. In addition, constructional deficiencies and design limitations cause undesired precession of the gyroscope with resulting drift errors, both fixed and random. For example, constraint errors occur due to torques induced by the elasticity of power leads and the reaction of gyroscope pick-offs or signal transducers. If the gyroscope rotor is not precisely balanced about its precession axis, a mass unbalance error occurs under the influence of gravity or other acceleration. Another source of gyroscope drift error, termed anisoelasticity, is caused by unequal deformations of the gyroscope support structure when load is applied from different angles. Various gyroscope errors, such as those listed above, cause degradation of the aircraft system's performance. Although some of these errors, particularly those of a fixed nature, can be partially eliminated by calibration and the application of biases during operation of the gyroscope, the procedures are generally time-consuming and costly, and often require use of expensive calibration calibration apparatus, such as a computer.

SUMMARY OF THE INVENTION

A principal feature of the present invention is that an instrument is provided for computing the pitch angle from a source of measured aircraft pitch angle, while eliminating errors associated with the pitch source. More particularly, the instrument includes a source of acceleration along the longitudinal axis of the aircraft, a source of measured aircraft pitch angle, and a source of aircraft air speed. A complementary filter is connected to the sources and summing means is connected to the filter from which a computed pitch signal is established.

Another feature of the invention is that the complementary filter includes a low pass filter connected with the source of aircraft acceleration, with the air speed sources and substitute therefor—a high pass filter connected with the measured pitch source and a band pass filter connected with the air speed source.

A further feature of the invention is that the calculated and measured pitch signals are blended together in inverse proportions as may be desirable, depending on the application or end use of the pitch signal.

Further features will become more fully apparent in the following description of the embodiment of this invention and from the appended claims.

DESCRIPTION OF THE PREFERRED EMBODIMENT

Figure 1:
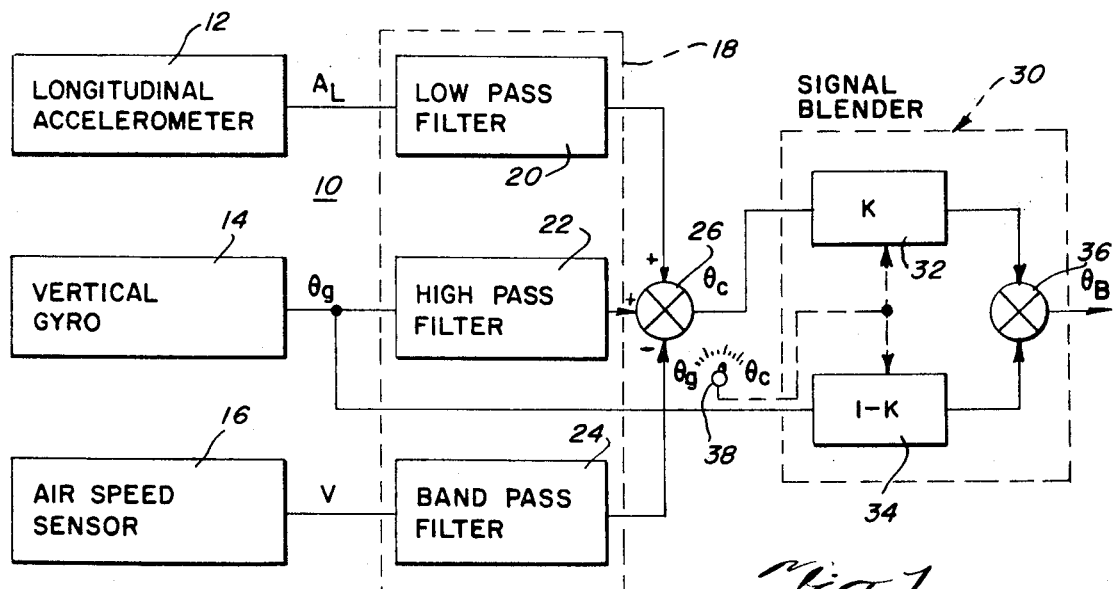
FIG. 1 is a functional block diagram of the instrument of the present invention.

Referring no to FIG. 1, an aircraft instrument, generally designated 10, is shown which calculates the pitch angle of an aircraft. A longitudinal accelerometer 12 provides a signal representing acceleration, $A_L$, along the axis of the aircraft, a vertical gyroscope 14 provides a signal representing measured aircraft pitch angle, $\theta_g$, and an air speed sensor 16 provides a signal representing aircraft air speed, V.

The acceleration, pitch and air speed sources are connected to a complementary filter, generally designated 18. In the filter 18, a low pass filter 20 is connected with the source of longitudinal acceleration $A_L$, a high pass filter 22 with the source of measured pitch angle $\theta_g$, and a band pass filter 24 with the source of air speed V. The outputs of filters 20, 22 and 24 are combined at summing point 26 and a signal is established representing a computed pitch angle, $\theta_C$.

An accelerometer utilizing a moving mass has an axis along which acceleration is sensed. If the accelerometer is accelerated in a direction oblique to its sensing axis, only the component of the acceleration along the sensing axis is indicated; if the accelerometer is moved in a direction perpendicular to its sensing axis, no acceleration will be indicated. Thus, the acceleration sensed by an accelerometer is a function of the angle between its sensing axis and its direction of acceleration. In the present instrument, the longitudinal accelerometer in an aircraft has an output which is a function of both the forward acceleration or change in aircraft forward speed and the aircraft pitch angle, through which the acceleration of gravity acts.

The deficiencies of the measured pitch signal from the vertical gyroscope, particularly the static offset and long term drift, have been described above. On the other hand, the long term pitch component of the accelerometer signal is, if the accelerometer is properly installed and adjusted with respect to the airframe, free of these problems. The pitch signal from the vertical gyroscope, however, includes an accurate high frequency pitch signal. The pitch calculating instrument of this application makes use of these signal characteristics to calculate an accurate pitch signal, free of the long term inaccuracies of the vertical gyroscope measured pitch signal.

The output signal from the longitudinal accelerometer is made up of two components, one representing forward acceleration and the other representing pitch angle. In order to utilize the pitch angle component, it is necessary to separate it from the forward acceleration signal. The output of air speed sensor 16 is a signal, V, representing the aircraft velocity. The sensor may, for example, be a pitot system which determines velocity by comparing dynamic air pressure with static air pressure. The air speed signal is coupled to band pass filter section 24, the output of which represents the rate of change of air speed, a signal which is equivalent to the forward acceleration signal from longitudinal accelerometer 12. The air speed acceleration signal from the air speed sensor is subtracted from the output of low pass filter 20 at summing junction 26 and the resulting signal is a function essentially only of the long term pitch attitude of the aircraft.

The output of vertical gyroscope 14 is connected through high pass filter 22 to eliminate the static and long term portions of the measured pitch signal. The filter output signal is a function essentially only of the short term pitch attitude of the aircraft. The short term pitch information, which is missing from the output of low pass filter 20, is connected with summing junction 26. The output from the summing junction is a calculated pitch signal, $\theta_C$, having long term, low frequency information form the longitudinal accelerometer 12 and short term or high frequency information from the output of vertical gyroscope 14.

In a representative system, the three filter sections 20, 22, and 24 of complementary filter 18 might have the transfer function set forth in the following table:

Low pass filter 20  $\dfrac{57.3}{(\tau s+1)^2}$

High pass filter 22  $\dfrac{\tau^2 s^2 + 2\tau s}{(\tau s+1)^2}$

Band pass filter 24  $\dfrac{\dfrac{57.3}{K} s}{(\tau s+1)^2}$ where $K = 19$ kts/sec/g The output of longitudinal accelerometer 12 may be represented as $$\frac{\dot{V}}{K} + \sin\theta = \frac{\dot{V}}{K} + \frac{\theta}{57.3}$$

where $V$ is expressed in knots per second and $\theta$ in degrees and $K$ is a constant. $\theta/57.3$ is a sufficiently accurate approximation of $\sin\theta$ for pitch angles up to 15° or even 20°.

The output of low pass filter 20 is $$\left(\frac{\dot{V}}{K} + \frac{\theta}{57.3}\right)\frac{57.3}{(\tau s+1)^2} = \dot{V}\frac{57.3}{K}\frac{1}{(\tau s+1)^2} + \frac{\theta}{(\tau s+1)^2}$$

The output of vertical gyroscope 14 is a measured pitch signal. The output of high pass filter 22 is $$\theta \frac{(\tau^2 s^2 + 2\tau s)}{(\tau s+1)^2}$$

The air speed output $V$ of sensor 16 is coupled to band pass filter 24 which has an output of the following form $$\dot{V}\frac{57.3}{K}\frac{s}{(\tau s+1)^2} = \dot{V}\frac{57.3}{K}\frac{1}{(\tau s+1)^2}$$

The calculated pitch signal $\theta_C$ from summing junction 26 may be expressed as follows $$\theta_C = \dot{V}\frac{57.3}{K}\frac{1}{(\tau s+1)^2} + \frac{\theta}{(\tau s+1)^2} + \frac{\theta(\tau^2 s^2 + 2\tau s)}{(\tau s+1)^2}$$

$$-\dot{V}\frac{57.3}{K}\frac{1}{(\tau s+1)^2} = \theta\frac{\tau^2 s^2 + 2\tau s + 1}{(\tau s+1)^2} = \theta$$

Band pass filter 24 derives from the air speed signal $V$ a signal representing air speed changes which effectively cancels the forward acceleration component of the output of longitudinal accelerometer 12.

Figure 2:
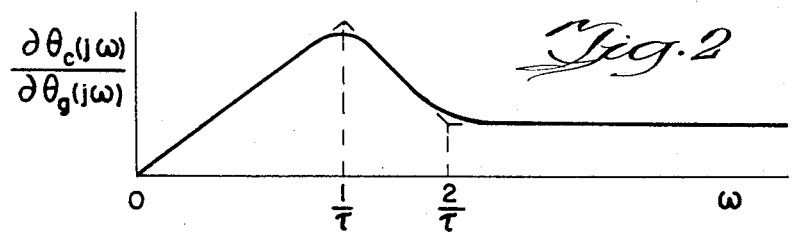
FIG. 2 is a curve showing the relationship of a change in calculated to measured pitch angle as a function of frequency.
Figure 3:
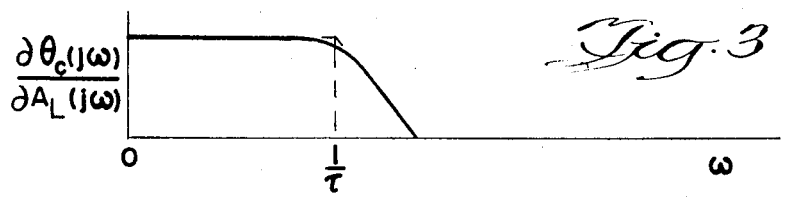
FIG. 3 is a curve showing the relationship of a change in calculated pitch angle to a change in longitudinal acceleration as a function of frequency.
Figure 4:
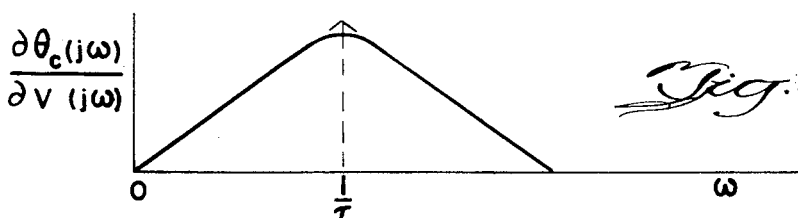
FIG. 4 is a curve showing the relationship of a change in calculated pitch angle to a change in air speed as a function of frequency.

FIGS. 2, 3, and 4 illustrate graphically some of the characteristics of the calculated pitch signal with respect to the system inputs, as a function of frequency. In FIG. 2 the ratio of measured pitch to calculated pitch is plotted. At zero frequency, i.e., steady state or static pitch measurement, the measured pitch signal $\theta_a$ from the vertical gyroscope does not appear in the calculated pitch signal. The contribution of the vertical gyroscope reaches a maximum at a frequency of $1/\tau$ and then decreases to the frequency $2/\tau$. At higher frequencies the contribution of the vertical gyroscope signal is constant and, as will appear, provides essentially the entire calculated pitch signal.

In FIG. 3, the differential relationship of calculated pitch to the output of the longitudinal accelerometer is plotted. The relationship is constant from zero frequency to $1/\tau$ and then decreases rapidly to zero. The calculated pitch signal does not include any high frequency components of the longitudinal accelerometer output.

In FIG. 4 the differential relationship of the calculated pitch signal to air speed is shown. At zero frequency air speed is not a factor. It reaches a maximum at a frequency $1/\tau$ and again decreases to zero, complementing the forward acceleration component of the output of the longitudinal accelerometer.

The calculated pitch signal $\theta_C$ is free of steady state and long term errors in the vertical gyroscope. Under most flight conditions $\theta_C$ provides a very accurate pitch signal. However, in a condition of wind shear, where the wind velocity varies with altitude, a plane which is climbing or descending will experience an error in the calculated pitch signal because the shear causes an inertial acceleration or deceleration without a change in air speed.

The instrument illustrated in FIG. 1 includes a signal blender 30 which permits the selection of either the measured pitch signal $\theta_a$ from the vertical gyroscope, the calculated pitch signal $\theta_C$ or a combination of the two signals. The signal blender comprises two variable gain amplifiers 32 and 34 connected with the outputs of summing junction 26 and vertical gyroscope 14, respectively. The outputs of the two amplifiers are combined at summing junction 36 providing a blended pitch signal, $\theta_B$. Amplifier 32 has a gain factor of $K$ while that of amplifier 34 has a gain factor of $1-K$. The $K$ gain factor for the two signals may be preselected by the manipulation of control 38.

Figure 5:
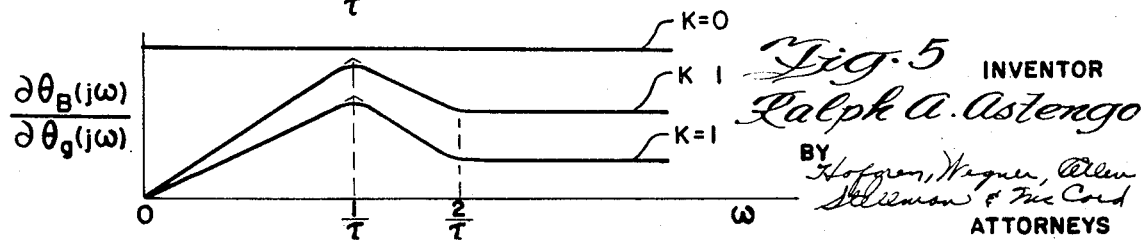
FIG. 5 is a curve showing the relationship of blended to measured pitch angle as a function of frequency for different gain constants used in the signal blender.

The operation of the blender is illustrated graphically in FIG. 5 where the ratio of the blended pitch output signal $\theta_B$ to measured pitch $\theta_a$ is plotted as a function of frequency for various values of $K$. When $K$ equals zero, $\theta_b = \theta_a$ and the ratio is 1. When $K = 1$, the ratio is the same as that of FIG. 2. For intermediate values of $K$, the ratio assumes an intermediate value.

I claim:

1. A pitch angle generator for an aircraft, comprising:

a longitudinal accelerometer having an output which is a function of the forward acceleration and the pitch attitude of the aircraft;

a vertical gyroscope having an output which represents the measured pitch of the aircraft, subject to static and long time drift errors;

first means for deriving from the output of the longitudinal accelerometer a signal which is a function essentially only of the forward acceleration and the long term pitch attitude of the aircraft;

second means for deriving from the output of the vertical gyroscope a signal which is a function essentially only of short term pitch attitude of the aircraft;

third means for developing a signal representing forward acceleration of the aircraft; and combining means for subtracting the forward acceleration signal from the signal derived by the first means and adding said long term and short term pitch attitude signals to generate a calculated pitch signal.

2. The pitch angle generator of claim 1 in which the means for developing a signal representing forward acceleration of the aircraft includes means for measuring the air speed of the aircraft and means for establishing a signal representing the rate of change of the air speed.

3. The pitch angle generator of claim 1 in which the two signal deriving means form a complementary filter having a low pass filter section connected with the output of said longitudinal accelerometer and a high pass filter section connected with the output of said vertical gyroscope.

4. The pitch angle generator of claim 3 in which the means for developing a signal representing a forward acceleration of the aircraft includes means for measuring the air speed of the aircraft and means, including a band pass filter section, for establishing a signal representing the rate of change of air speed, which is combined with the output of said low pass filter section.

5. The pitch angle generator of claim 1 including means for summing a signal representing the measured pitch of the aircraft from the vertical gyroscope and the calculated pitch signal from said combining means, to form a blended pitch signal.

6. The pitch angle generator of claim 5 in which said summing means relates the calculated and measured pitch signals by factors of $K$ and $1-K$, respectively, where $K$ is a positive factor which is not greater than one.

* * * * *